L. P. AYRES.
GENERATOR GOVERNOR.
APPLICATION FILED FEB. 12, 1916.

1,282,522.

Patented Oct. 22, 1918.

WITNESSES:
J. H. Swan
O. W. Scott

INVENTOR
LEVI P AYRES

BY
Lockwood & Lockwood
ATTORNEYS

UNITED STATES PATENT OFFICE.

LEVI P. AYRES, OF INDIANAPOLIS, INDIANA.

GENERATOR-GOVERNOR.

1,282,522.   Specification of Letters Patent.   Patented Oct. 22, 1918.

Application filed February 12, 1916.  Serial No. 78,007.

*To all whom it may concern:*

Be it known that I, LEVI P. AYRES, a citizen of the United States, and a resident of Indianapolis, county of Marion, and State of Indiana, have invented a certain new and useful Generator-Governor; and I do hereby declare that the following is a full, clear, and exact description thereof, reference being had to the accompanying drawings, in which like letters refer to like parts.

The object of this invention is to provide a governor for generators or the like adapted to control a clutch, whereby the driving pulley on said generator will be released when the generator is driven above a determined speed, thereby preventing its burning out.

The chief feature of the invention consists of governor balls or weights attached to a spring member or members secured to the shaft of the generator, said spring member bearing against a clutch disk for gripping a pulley so that when the governor balls are thrown out by excessive speed, the spring is released and the clutch disk releases the pulley so that it is free to rotate without operating the generator.

This may also be accomplished by placing shoes on the ends of the spring for directly engaging the face of the pulley, thus doing away with the disk.

The full nature of the invention will be understood from the accompanying drawings and the following description and claims.

Figure 1:
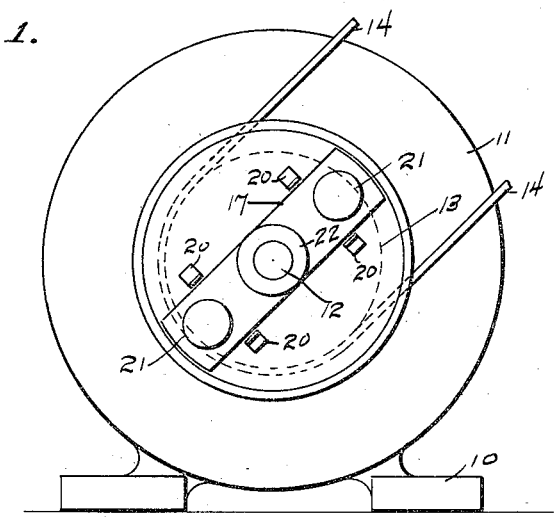
Figure 2:
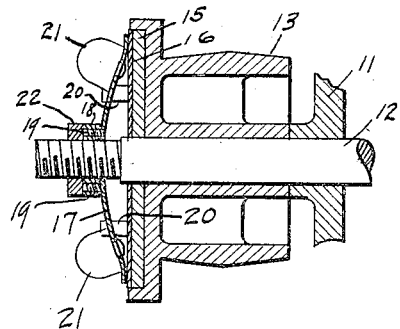
Figure 3:
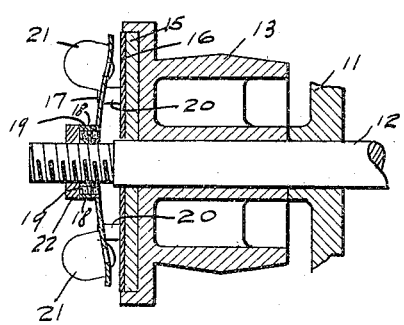

In the drawings, Figure 1 is an end elevation of the generator showing the governor, clutch disk and pulley. Fig. 2 is a central vertical cross section through the governor and pulley. Fig. 3 is the same as Fig. 2 with the governor thrown in releasing position.

In the drawings there is shown a generator base 10 which supports a generator housing 11 of the ordinary type. Said generator is mounted on a shaft 12. Loosely mounted on said shaft there is a pulley wheel 13 adapted to be driven by a pulley belt 14 from a driving means, not shown herein. On one end of said pulley there is a leather clutch facing 15 against which a metal clutch disk 16 is forced by means of a spring 17, the disk 16 being loosely mounted upon the shaft 12. Said spring is secured to a disk 18 by means of screws 19 so that it may be adjustably tightened against said disk by screwing the disk 18 on the threaded end of the shaft 12. There are two pairs of lugs 20 secured to said disk which pass on opposite sides of the spring, thus preventing its turning independently of the spring.

On either end of said spring there are governor balls 21, which, when forced outward by centrifugal force, release the tension of said spring, thereby loosening and allowing the clutch disk to slide on the leather clutch facing 15, whereby the generator may revolve and will be released from the pulley until its speed is reduced sufficiently to allow the spring to resume its tension and the clutch take hold. On the outer threaded end of the shaft there is a lock nut 22 for locking the disk 18 and the spring 17 in the desired position. By this means the tension may be regulated so that the generator will release the clutch at a greater or less speed. It should be understood that this invention is not limited to the use of a regulating locking means, but may be locked in the ordinary way.

The invention claimed is:

1. The combination with a driven shaft having a driving pulley loosely mounted thereon, of a clutch disk loosely mounted on said shaft in position to frictionally engage said pulley, and a plate spring having weights thereon adapted to be locked on said shaft in position to bear against said disk for forcing it into engagement with said pulley, said weights causing said spring to disengage said disk when revolved at a high speed.

2. The combination with a driven shaft having a driving pulley loosely mounted thereon, of a clutch disk mounted on said shaft in position to frictionally engage said pulley, a plate spring adjustably locked on said shaft adapted to bear against said disk for forcing it into engagement with said pulley, and a weight mounted on each end of said spring for releasing it by centrifugal force, thereby releasing said disk from said pulley and allowing the pulley to run free on said shaft when driven at a high speed.

3. The combination with a driven shaft having a driving pulley loosely mounted thereon, of a clutch disk loosely mounted on said shaft in position to frictionally engage said pulley, a plate spring on said shaft adapted to bear against said disk for forcing it into engagement with said pulley, a weight mounted on each end of said spring, and an adjustable nut for adjusting the tension of said spring against said driving wheel for permitting said weight to release said spring and allow said driving wheel to run free when driven at a determined speed.

4. The combination with a driven shaft having a driving pulley loosely mounted thereon, and a clutch facing carried by said pulley, of a clutch disk adapted to bear against the clutch facing, pairs of lugs on said clutch disk, a spring adjustably secured to said shaft and having its ends in position to normally engage said disk for clamping the disk against the facing, said spring passing between the pairs of lugs for causing the disk to rotate with the spring; and balls on the ends of the spring adapted to move the ends of the spring out of engagement with the disk when the pulley is rotated at a predetermined speed.

In witness whereof I have hereunto affixed my signature.

LEVI P. AYRES.

Copies of this patent may be obtained for five cents each, by addressing the "Commissioner of Patents, Washington, D. C."